United States Patent
Ginestet et al.

(10) Patent No.: US 12,540,479 B2
(45) Date of Patent: Feb. 3, 2026

(54) CAISSON HEIGHT PROFILER SYSTEM AND METHOD

(71) Applicant: WHITEWATER WEST INDUSTRIES LTD., Richmond (CA)

(72) Inventors: Clement Ginestet, Saint-Ouen-sur-Seine (FR); Axel Terradillos, Vancouver (CA)

(73) Assignee: WHITEWATER WEST INDUSTRIES LTD., Richmond (CA)

( * ) Notice: Subject to any disclaimer, the term of this patent is extended or adjusted under 35 U.S.C. 154(b) by 127 days.

(21) Appl. No.: 18/535,802

(22) Filed: Dec. 11, 2023

(65) Prior Publication Data

US 2024/0191525 A1   Jun. 13, 2024

Related U.S. Application Data

(60) Provisional application No. 63/386,866, filed on Dec. 9, 2022.

(51) Int. Cl.
*E04H 4/00* (2006.01)
*G05D 7/06* (2006.01)
*G06F 3/0484* (2022.01)

(52) U.S. Cl.
CPC ......... *E04H 4/0006* (2013.01); *G05D 7/0641* (2013.01); *G06F 3/0484* (2013.01)

(58) Field of Classification Search
CPC .............................. A63B 69/0093; E04H 4/006
USPC ................................................. 405/79; 4/491
See application file for complete search history.

(56) References Cited

U.S. PATENT DOCUMENTS

| | | | |
|---|---|---|---|
| 3,473,334 | A | 10/1969 | Dexter et al. |
| 4,539,719 | A | 9/1985 | Schuster et al. |
| 4,999,860 | A | 3/1991 | Chutter et al. |
| 11,891,834 | B2 | 2/2024 | Ginestet et al. |
| 12,180,738 | B2 | 12/2024 | Ginestet et al. |

(Continued)

FOREIGN PATENT DOCUMENTS

| | | |
|---|---|---|
| EP | 2728089 B1 | 9/2020 |
| WO | 2024119282 A1 | 6/2024 |

OTHER PUBLICATIONS

Co-pending U.S. Appl. No. 18/490,604, inventors Ginestet; Clement et al., filed Oct. 19, 2023.

(Continued)

*Primary Examiner* — Sunil Singh
(74) *Attorney, Agent, or Firm* — Buchalter LLP

(57) ABSTRACT

A system and method for creating and controlling a wave profile in a wave pool by controlling the water height profile in each of the chambers of the wave pool. The wave pool includes a plurality of wave generating chambers, each comprising one or more intake valves and exhaust valves. The valves are capable of being controlled to selectively open and close to a valve angle of fully open, fully closed, or any angle between. Using a graphical user interface, a user creates a water height profile for each chamber that dictates the resulting wave generated and released into the pool. Multiple custom chamber profiles may be grouped to create a custom wave section. Multiple custom wave sections may be grouped to create a custom wave. The system and method provides for increased customization of the wave, as well as reduced turbulence and increased efficiency of the system.

12 Claims, 4 Drawing Sheets

(56) References Cited

U.S. PATENT DOCUMENTS

2014/0115770 A1     5/2014   McFarland
2022/0290455 A1     9/2022   Ginestet et al.

OTHER PUBLICATIONS

Non-Final Office Action for U.S. Appl. No. 18/604,300, dated Jun. 21, 2024, 15 pages.

CAISSON HEIGHT PROFILER SYSTEM AND METHOD

CROSS REFERENCE TO RELATED APPLICATIONS

This application claims the benefit of U.S. Provisional Patent Application Ser. No. 63/386,866, filed on Dec. 9, 2022, entitled "Caisson Height Profiler GUI," which is incorporated by reference in its entirety.

BACKGROUND OF THE INVENTION

The present invention relates to the field of wave generation for recreational wave pools. More particularly, it relates to a system and method that employs a controller and graphical user interface (GUI) for creating and controlling a wave profile by controlling multiple chamber profiles. The pool wave generator has a pool area and a plurality of chambers for generating a wave in the pool area. Exemplary embodiments may be used to control the wave generated from the chambers, reduce unwanted turbulence, and/or generate a designed wave based on the individual control of the respective chambers, such as disclosed in U.S. patent application Ser. No. 17/652,680 to Ginestet, et al. This method allows a full control of each caisson's water height profile. The current invention allows for the creation of new profiles that cannot be accomplished by older technology.

BRIEF SUMMARY OF THE INVENTION

This invention is a system and method that employs a controller and GUI allowing the user to take advantage of the improvements described in Chamber and Control System and Method for Generating Waves, U.S. application Ser. No. 17/652,680, which describes, among other things, the ability to position chamber intake and exhaust valves at various angles to provide for greater control over the behavior of the chamber and the wave generating system as a whole. This method allows a full control of each caisson's water height profile, which allows for more granular control over the ultimate characteristics of the wave produced. This is in contrast to prior art systems that cannot achieve precise water height targets due to the binary and pre-defined nature of the valve control.

In various aspects of the invention, the user is presented with the opportunity to customize wave generated in a wave pool through increasingly specific parameters. Thus, the invention allows the user to take advantage of variable valves to create specific chamber profiles, which ultimately result in specific waves in the pool. A chamber profile (or chamber water height profile) is a set of parameters that dictate how the water is moving in one caisson or chamber. For example, water height velocity in the chamber (i.e., the height the in the chamber the water needs to get to and how fast it needs to get to it). A profile has no notion of time, only parameters for pre load height and dampening parameters (PID gain coefficients $K_p$, $K_i$, $K_d$). The gain coefficient will change how the controller reacts to correct the error. Proportional gain ($K_p$) will change how fast the controller tries to correct an error; high $K_p$ will create instabilities and create overshoots where the system attempts to correct the error too quickly; adding derivative gain ($K_d$) will smooth these instabilities; integral gain ($K_i$) will allow the system to be closer to the final target. Some of these coefficients (except $K_p$) can be set to zero. Utilizing different chamber profiles, the user can then group one or more profiles together to create a specific wave section; wave sections can be organized together to create a specific wave in the pool. Thus, in one aspect of the invention, each step allows the user to build upon prior customizations in order to mix and match to create the desired wave.

In one aspect of the invention, the user utilizes various GUI screens to modify the wave conditions or parameters inside each chamber through using the described surf pool program. On a first screen, a user may presented with options to pre-load the wave in the chamber using options such as water height, valve angle, velocity profile, etc. A second screen allows the user to chain together one or more wave profiles (e.g., from the previous screen) to create a wave section. A third screen allows the user to chain together one or more wave sections into a full wave program. The details regarding each section are presented in more detail below.

The invention thus provides several advantages including: bigger waves (by taking advantage of resonance), new type of waves (by changing the natural profile of the water height in the caisson); concurrent generation of differently sized waves in opposite ends of the wave pool; ability to tune waves are section-by-section, and caisson-by-caisson, as granular as the caisson water height profile These and other embodiments of the present invention will become apparent to those skilled in the art from a consideration of the following detailed description taken in combination with the accompanying drawings and by the elements, features, and combinations particularly pointed out in the claims. It should be noted that the figures accompanying the description below are preferred embodiments of one aspect of the invention.

BRIEF DESCRIPTION OF THE DRAWINGS

Exemplary embodiments will be described and explained with additional details through the use of the accompanying drawings.

DETAILED DESCRIPTION OF THE INVENTION

Figure 1:
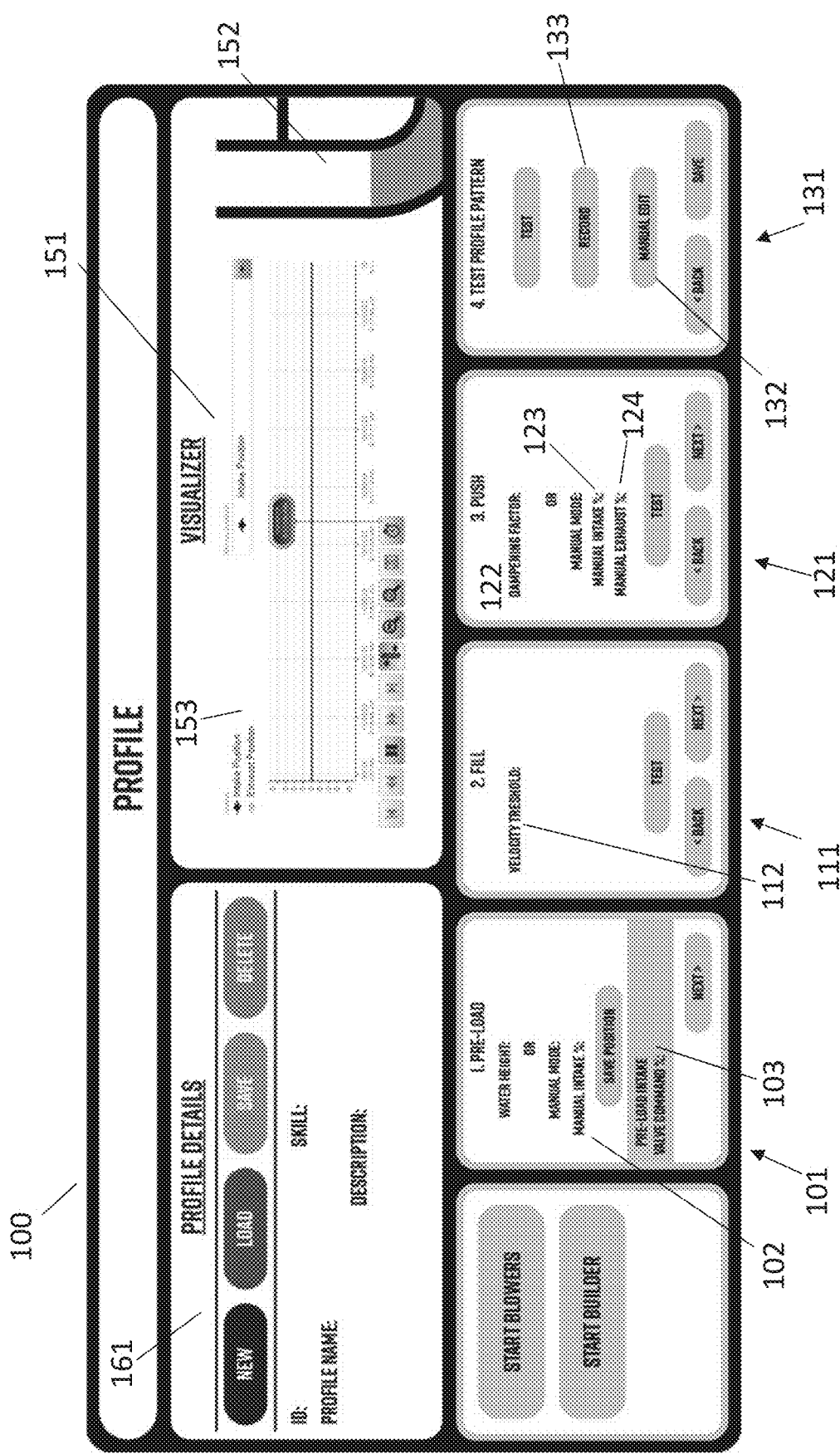
FIG. 1 illustrates a caisson height profiler screen according to one embodiment of the invention.

For decades, prior art systems have controlled the wave pattern through sequencing and timing. However, the user has no control over the profile. See, for example, U.S. Pat. No. 4,999,860 to Chutter et al. The current invention allows the user to create and tune the water height profile for each caisson individually without having to rely on sequencing or timing of the sequencing of one chamber in relation to another. The invention thus allows a user to fully customize a wave for use in a wave pool via a more granular approach to conditions inside each chamber. The user can modify the wave conditions or parameters inside each chamber using the described surf pool program user interface.

In one aspect, the user is presented with a series of screens, with each screen representing a different aspect of the wave creation process. On a first screen, a user may presented with options to pre-load the wave in the chamber using options such as water height, valve angle, velocity profile, etc. A second screen allows the user to chain together one or more chamber water height profiles (e.g., from the previous screen) to create a wave section. Here, the user can choose a preset size and speed/angle of the wave portion created by a particular caisson. A third screen allows the user to chain together one or more wave sections into a full wave program. The details regarding each section are presented in more detail below.

In one embodiment, the invention allows the operator to enter water height commands or targets, which the controller will transform to a valve command via a proportional-integral-derivative (PID) controller taking water height feedback from a sensor located in each chamber. The invention also allows for tuning the parameters of the PID to control the speed with which the controller matches the water height target(s). In summary, the invention allows for setting a water height target while also allowing control over the speed with which the controller will match the target, thereby allowing control over the speed in the caisson. Thus, the height and velocity in the caisson are both controlled, allowing for the creation of new profiles which cannot be accomplished by the prior art.

In one aspect of the invention, the user is granted greater control over caisson resonance. In traditional pneumatic surf pools, the water movement in the caissons exhibits a spring-like behavior. If the water is "excited" at the right frequency, the caisson could enter in resonance with the water going higher up and higher down at each iteration. In prior art systems, this resonance is not achievable due to lack of precise control—i.e., there is not enough power or the strokes are too high, creating too much turbulence. By setting the right parameters, the invention described herein enables creation of a profile that takes advantage of the resonance or partial resonance to create bigger waves or wave sections.

In another aspect of the invention, the velocity profile of the wave generation system is improved. In existing systems, the velocity profile is always the same, meaning that the water velocity profile will change only based on vent time. The invention allows not just control over the water height profile but also the velocity profile, which unlocks another control for wave generation.

In another aspect of the invention, the system improves the ability to customize the period and water height profile. In prior art systems, the chamber rising water profile and the period depend only on the caisson shape and the initial pressure in the caisson. The invention allows the user to fine tune the period and water profile creating more possibilities for the wave generation.

In another aspect of the invention, the user is provided greater control over the wave pattern by selecting various chamber height profiles, which can be different in every caisson, to create wave sections and ultimately an entire wave.

Prior art attempts at providing greater control over wave patterns include the use of a hard-coded wave pattern. Most prior art pneumatic wave pools have hard-coded wave patterns programmed in. Because the sequencing is hard-coded, there remains only a limited ability to "tweak" the timing. Another attempted solution involved a wave creation module that allows the user to create or modify a profile without hard coding it. In that solution, the user draws the wave profile on a touch screen with the caissons in one axis and time in the second axis. In both of these existing solutions, the experience was limited because the user was not allowed to model or control the water height profile in the caisson during the chambers section. While prior art methods focus on the wave itself, this invention describes a method to go more in detail to tune the wave section-by-section and to even go as granular as tuning the water height profile in each caisson.

One aspect of the invention lies in the surf pool program user interface (GUI). A number of screens in the GUI are dedicated to the wave generation process. A first screen allows the user to go choose details of the caisson profile, such as water height and dampening. A second screen allows the user to bundle multiple desired profiles together into desired wave sections, where a section may be of different length and may be a combination of the same or different profiles. This represents a departure from the prior art, which treats the wave as a sequenced firing of the chambers. Here, the sequential nature of the wave is eliminated due to the coordination of profiles, as further described below.

Wave generating devices for wave pools are well known in the art, and typically include many chambers—perhaps dozens in a given pool—arranged along a wall of a pool. Each chamber will typically have at least one intake valve by which air (or another gas) is taken into the chamber, and at least one exhaust valve, by which air (or another gas) is vented out of the chamber. It is understood that each chamber has one or more intake valves and one or more exhaust valves that are independently operable, such that the intake valve(s) can be selectively opened or closed to any angle, and the exhaust valve(s) can be selectively opened or closed to any angle, without regard to the opening angle of the other valve. Likewise, the angle of opening of the intake (or exhaust) valve in one chamber is not dependent on (and does not necessarily affect) the opening of the intake (or exhaust) valve in any other chamber. It should also be understood that in the examples in this description, a single intake valve and a single exhaust valve per chamber are used for purposes of explaining the invention, however the system and method may also be adapted for multiple intake valves and/or multiple exhaust valves per chamber.

The operation of each chamber is rooted in the chamber profile (or chamber water height profile) for each chamber. A chamber profile is a set of parameters that dictate how the water is moving in one caisson or chamber. For example, water height velocity in the chamber (i.e., the height the in the chamber the water needs to get to and how fast it needs to get to it). A profile has no notion of start time, only parameters: pre load height and dampening parameters (PID gain coefficients $K_p$, $K_i$, $K_d$).

According to one embodiment of the invention, the chamber profile may comprise the following steps or procedures. A signal is sent from the controller, telling the valves to execute the chamber profile assigned to that chamber. The intake valve dynamically adjusts its position to hold the water at the set pre-load height in the caisson. The pressure is vented from the caisson—with the exhaust valve fully open, intake valve fully closed, or both valves opened to a predetermined valve opening angle to control the water going up—until the rising water reaches zero speed, or a value sufficiently close to zero.

Alternatively, instead of venting the caisson with exhaust fully open and intake fully closed, the system may control the exhaust valve with a controller monitoring the pressure in the caisson. The system may thereby slow the water rise and control the time required to reach the full chamber water height and thereby drastically change the shape of the resulting wave. This alternative procedure may be beneficial for lower level scenarios and for specialty waves.

Returning to the operation of the invention, the intake valve again opens (or opens to a greater extent) to introduce pressurized air into the chamber and push the water down in the chamber. The intake valve opening angle is dynamically adjusted to match the set preload heights for that chamber, and according to the dampening coefficient set by the user (a set of Kp, Kd, Ki coefficients) or automatically selected by the system. In order to implement this procedure in a water park or at a wave pool, a graphical user interface (GUI) is implemented.

FIG. 1 depicts one embodiment of a GUI for a profiler 100 that allows the user to build a profile for a caisson by tuning parameters such as height, velocity, etc. As shown here, the profiler 100 allows a user to build custom parameters for a particular chamber in a wave generating device. Employing the variable valve technology described in U.S. patent application Ser. No. 17/652,680, the invention allows the user to customize how the intake and exhaust valves behave, and thus how the water in each chamber behaves. As shown in FIG. 1, the particular chamber to which the profile will be assigned has not yet been determined. Rather, the screen in FIG. 1 is intended to provide a chamber profile that can be used in any number of chambers in any number of locations along the wave pool, as described hereafter.

The user may begin by focusing on the pre-load module 101 of the user interface. Pre-load refers to the aspect of operation of each chamber in which the water in the chamber is drawn in to a set height within the chamber. Thus, the user is presented with options to pre-load the water in the chamber using options such as water height, valve angle (manual intake %), etc. The user can define target heights over different steps, whereby the system will translate these height targets into valve opening positions that match the profile provided by the user. For example, a user may select to have a particular water height target, followed by a release into a pool, then have the chamber refill to a second water height (which may be the same as or different than the first height), followed by another release. The controller will then fit a curve to match the user's input profile. Alternatively, instead of using a present water height profile, the user may input a particular valve angle profile over time, which the controller will then match.

As shown in FIG. 1, the user in the pre-load section 101, instead of setting a height and letting the system determine valve settings, etc., may choose to activate "manual mode," which allows the user to choose a particular values or positions of the valves and other relevant parameters in the caisson. In manual mode, the user can set a predetermined valve angle for the pre-load and for the wave dampening. The user will be able to choose how the system goes to these predetermined angles (following a known function such as step, sine, cosine, etc., or a custom function made by the user). For example, FIG. 1 shows the "manual intake %:" input 102 in the pre-load module 101, where, for example, a manual intake position of 0% would indicate that the chamber intake valve is fully closed, while 100% would indicate that the chamber intake valve is fully open. The user is also able to select any desired opening position between 0 and 100% to build the custom chamber profile desired. A person of skill in the art will recognize that instead of using a percentage (e.g., 0% representing fully closed) to represent the valve position, the system may instead use angle (e.g., 90° representing fully closed). Likewise, the particular names used for each input (e.g., "manual intake") are simply a matter of preference, and may be substituted with different names as best suits the user.

In auto mode (manual mode off), the user will chose the water height and pre-load intake valve command % 103 will be automatically determined by the controller. Thus, when the user selects a particular pre-load water height, the pre-load valve angle % will be set by the controller and displayed on the GUI. When manual mode is on, the pre-load intake valve command % 103 will be the same as the manual intake % 102.

In this embodiment, once the pre-load conditions have been set, the user will proceed to the fill module 111. "Fill" refers to filling the chamber with water, and in particular the velocity with which the water fills the chamber. The velocity threshold 112 signifies the point at which water will be pushed down in the chamber as soon as the water surface attains a specific speed value (displayed in m/s).

The user then engages the "push" module 121, referring to the descent of the water in the caisson. By dampening the spring-like action of the water, the user may gain greater control over the wave profile. In auto mode (manual mode off), the controller will choose a dampening factor 122, which corresponds to a residual wave attenuation factor discussed elsewhere in this disclosure. The greater the dampening factor, the smoother the water descent, reducing the residual wave, and vice versa. In manual mode, the user may select the "manual intake %" 123 as well as the "manual exhaust %" 124 to adjust the valve angle of the intake and exhaust valves during the dampening phase of operation. The decision whether to enter manual mode may be effected by a slider switch on the user interface or through a radio button, or other methods for selecting between binary options that are well known in the art. The user may also choose how the valve enters the manual command, such as step, sine, cosine etc.

Figure 2:
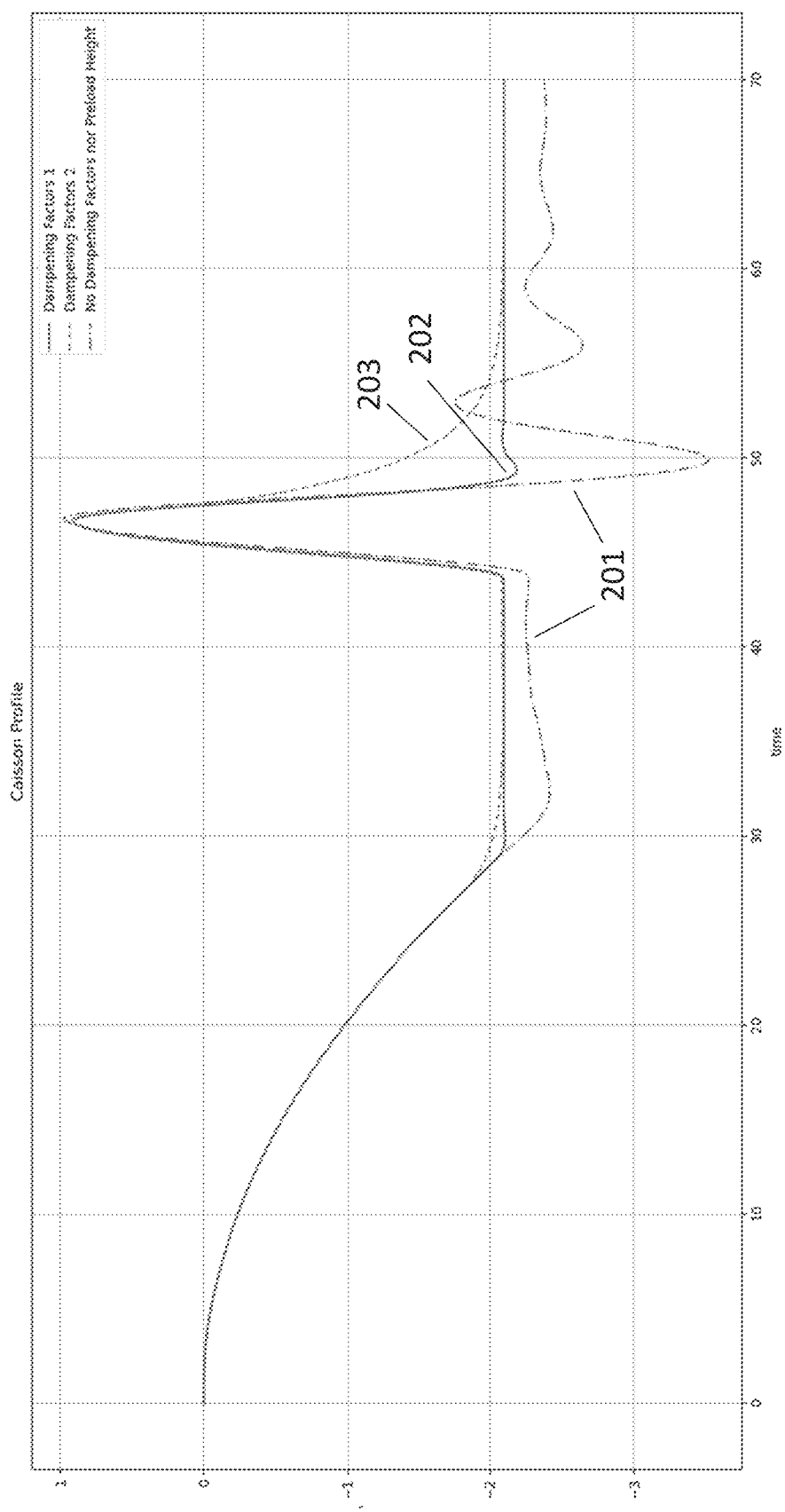
FIG. 2 illustrates two different control modes following the same height profiles compared to no control, according to one aspect of the invention

In an alternative control mode, the user can choose how fast the system will follow the target profile. This will allow to control the steepness of the wave. FIG. 2 illustrates three different control modes following the same height profiles, but representing three different dampening factors that may be applied to the profile. A first profile 201 shows a mode with no dampening factors or pre-load height, which exhibits the greatest fluctuations in water height. A second profile 202, indicated by the solid line, shows a first dampening factor applied to the profile. This second profile 202 exhibits considerably less fluctuation, although there is still some fluctuation. A third profile 203, indicated by the dashed line, shows a second dampening factor applied to the profile. The third profile 203 exhibits less fluctuation than the first two profiles, and also exhibits a slower release. By using the dampening profile, the invention allows the user not only to dampen the residual wave, but also to control how fast the water height goes back to the pre-load state. The user is therefore afforded greater control over not just the water height, but also the velocity with which the water gets to the desired water height. As described, the start time of the entire system will be the same, with the valves in each caisson held at their respective angles for different durations and according to different profiles to achieve the desired wave form. In the embodiment described here, only two control modes are shown; however it will be understood that the user can input any control mode desired.

Turning back to the embodiment shown in FIG. 1, a final module is provided in the form a test profile pattern module 131 that will allow the user to test the profile created thus far. Importantly, the test profile pattern module 131 also includes options that allow the user to further refine and record the profile, which describes the valve angle over time. The manual edit function 132 allows the user to refine the pattern by opening the recorded profile and change the value of the valve angle manually, if desired.

Another feature of the caisson profile element 100 is the visualizer module 151. Through the visualizer module 151, the user can see a visual representation of how the water height in the caisson will change as the profile that has been created plays out. Here, the user may see a visual representation of the water height 152 at each point in the profile. In the visualization shown, the water height representation 152 roughly approximates a side view of a caisson, with the water level shown. As the profile plays out, the water level in the water height representation 152 will rise and fall in the pattern dictated by the profile the user has created in the previously described modules. At the same time, a time graph 153 in the visualizer module will provide a graphical indication of the intake valve and exhaust valve positions at each point in the profile. Although not shown in FIG. 1, it may also be beneficial to provide a visual depiction of the valves opening and closing to various valve angles in accordance with the profile running. Likewise, the water height representation 152 may instead be depicted as a graph or other visual representation instead of as a visual approximation of the caisson. A person of skill in the art will also understand that various other functionalities may be added to the visualizer, such as the ability to modify the profile using the GUI, such as through cutting, copying, and pasting a given segment shown in the visualizer time graph 153.

The profile details module 161 gives the ability to name, save, modify, and delete profiles. The profile details module 161 shown in FIG. 1 provides basic detail functionality such as the ability to assign an ID, profile name, skill level, and description to a profile. A person of skill in the art will recognize that these and other details may be useful to identify and recall particular profiles that satisfy a particular skill level, or that were created by a particular user, or that may be relevant to real life surf locations. The user is thus able to create a library of profiles from which custom wave sections and waves may be created. It is contemplated that in embodiments of the invention, users will have the option to share their library with other users, including both individual users as well as a "user" account associated with a water park operator, equipment manufacturer, or other organization. For example, a professional surfing organization may create a library of profiles that may be used by the organization for competitions, and which may be shared with other users to prepare for competition.

Likewise, a user may import a profile (and/or wave section or wave) with the associated valve settings that was created externally of the wave generation software at the facility. For example, a wave profile may be created using software running on a PC or smartphone application, then imported and played at the wave generator facility. In this scenario, the profiles may be recorded in a file comprising a series of valve angle positions for each caisson.

The record function 133 located in the test profile pattern module 131 is another aspect of this invention. Once the user has selected the best parameters for the desired profile, the user can chose to record the instructions that the signal will send to the caisson to create that particular profile so as to avoid constant relaying of data from the sensors. In a preferred embodiment, the recording records the intake valve angles played in each profile. The exhaust valve angle will not be recorded in the preferred embodiment as the power sensors that monitor the exhaust valves will remain active throughout the process, as described in U.S. patent application Ser. No. 18/490,604, titled "Butterfly Fan Inlet And Chamber Exhaust Valve Controllers For Wave Making System." Thus, the water level and pressure sensors in each chamber will be used to tune/create new waves but they will not be used during normal operations.

By recording the profile for later playback, the invention thus represents another improvement over the prior art due to the ability to greatly reduce—if not eliminate—the need to monitor pressure, temperature, or water height in the caisson during operation. Whereas many prior art systems may have relied on water height or pressure monitoring to know when and how to open or close the valves in a chamber, the invention described herein need not rely on sensors when the recorded profile is played back. Not only does the recording thus reduce the amount of data that must be gathered, relayed, and reacted to in real time during operation, it also provides advantages in the event that one or more sensors is not functioning properly. Once the profile has been created and recorded, the controller thereafter need only send out a single signal for the chamber to execute that particular profile, whereupon the valves begin to actuate to meet the parameters in the recorded profile. Thus, a single signal may be sent to all chambers in a system at once, whereupon all chambers will read the beginning of the profile and the intake valve angle accordingly. The chambers will then maintain the intake valve open angle at the pre-load stage until they enter the second stage (vent stage) of the process.

In one embodiment, the recording aspect of the invention is applicable may be applied to not just profiles, but also to wave sections or entire waves. Thus, a single signal may be sent to all chambers in a system at once, whereupon all chambers will begin to actuate their respective valves to follow the recorded caisson, section, and wave profile embedded in the signal.

Figure 3:
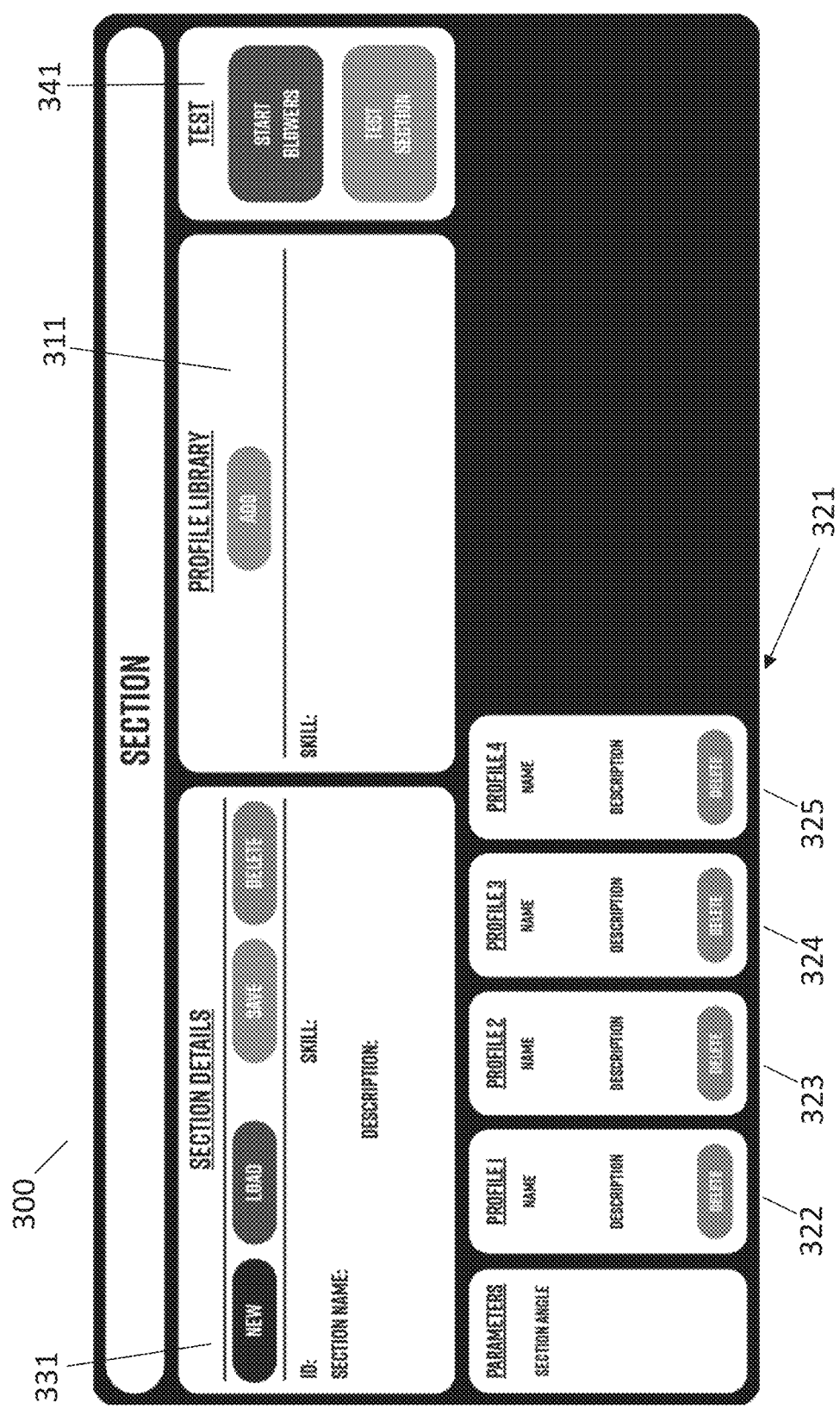
FIG. 3 illustrates an exemplary screen for controlling or tuning a section or set of caissons according to one embodiment of the invention.

As shown in FIG. 3, another aspect of this invention is the section designer 300. As used herein, a "section" or "wave section" refers to a subset of all chambers in a wave pool. For example, if a pool has thirty wave generation chambers, the wave may be divided into five equal sections comprising six caissons each. It should be understood that the division of a wave pool into sections need not be symmetric or equal. For example, in the example above, the wave pool chambers may be divided into four sections comprising seven chambers, three chambers, nine chambers, and eleven chambers, for a total of thirty chambers. As contemplated, one aspect of the invention is that as the profiles are customizable, the number and size of wave sections may also be fully customizable to best suit the needs of the user.

To create a section, the user can draw from a library of user-made profiles that represent distinct operating modes for individual chambers. Although the user might choose to use the same profile in all of the chambers in a system, it is contemplated that the user will choose to string together a number of different profiles to create a wave that is not uniform across the entire length of the pool. Instead, by drawing from the profile library, the user can build a wave section by assigning profiles to a group of caissons, with each chamber operating independently from the others and independent relative to an initial system ignition time. That is, in a preferred embodiment, each chamber will receive a signal from the controller at the same time, whereupon the chambers activate in unison to carry out their particular profile. Thus, the profile starts are not dependent on timing with respect to any other chamber. Instead, each profile is composed of instructions for pre-load water height and actuation, which starts in unison for each chamber. During actuation the water height in the caisson rises until the rise slows to below a threshold speed (typically close to zero). At that point, the push phase begins and the water in the caisson will return back to the pre-load level following the dampening correction parameters (Kp, Kd, Ki).

FIG. 3 depicts one embodiment of a wave section user interface 300 that may be used when a user is designing a wave section using profiles from a profile library. Here, the user simply adds profiles one at a time using the "profile library" module 311. In one embodiment, the user may choose to filter the profiles by any number of parameters, such as skill level (shown in FIG. 3), wave height, wave velocity, real world location of a wave, or any other parameter that might be useful to the user. Alternatively, the user may be presented with the entire library of profiles from which to choose.

In one embodiment, once a desired profile from the library is chosen, the user would the user would select "add" from the "add profile" module 311, and the profile would be added to the wave section order module 321. Each profile this added already has the parameters set from the profile element discussed above. FIG. 3 depicts a scenario where a user has added four profiles 322, 323, 324, 325 to the wave section order module 321. The user can create a section of any length he wants. Here, the four profiles 322, 323, 324, 325 are shown in summary form, such as by displaying the profile name, description or other relevant information. Alternatively, the profiles may offset by wave angle or wave speed. It will be appreciated that the user interface will allow the user to rearrange, delete, or add profiles to the wave section order 303 in order to build the desired wave section.

Although not shown in FIG. 3, in one embodiment, the user can employ the section element 300, to tune the angle of the section. This is done by indicating the pre-load start time of the first profile of the section and picking an angle and the program will automatically calculate the preload time of each other profile compared to the first profile. The angle of the section is usually related to the speed: low speed (high angle) is easier for beginner, higher speed (lower angle) is more difficult for more advanced surfers.

The user will preferably assign a name, ID, and/or description to each wave section using the section details module 331. Although ID, Skill, Section Name, and Description are shown in FIG. 3, a person of skill in the art will understand that more or fewer detail options may be provided for each wave section. The user may also choose to provide additional identifiers or parameters associate with the section, such as skill level, or section type (beginning, launch, flat, end, etc.). The user interface will also preferably allow the user to add, delete, or modify the wave section. As with the caisson profile element, it is contemplated that users of the system will build a library of wave sections that may be used by that user or other users to create a custom wave.

In one embodiment, a user may also test the wave section thus created. FIG. 3 depicts a test module 341 that provides options to begin the blowers to pressurize the caissons, and an option to begin testing the section sequence, meaning the section order shown in the section designer 300.

Figure 4:
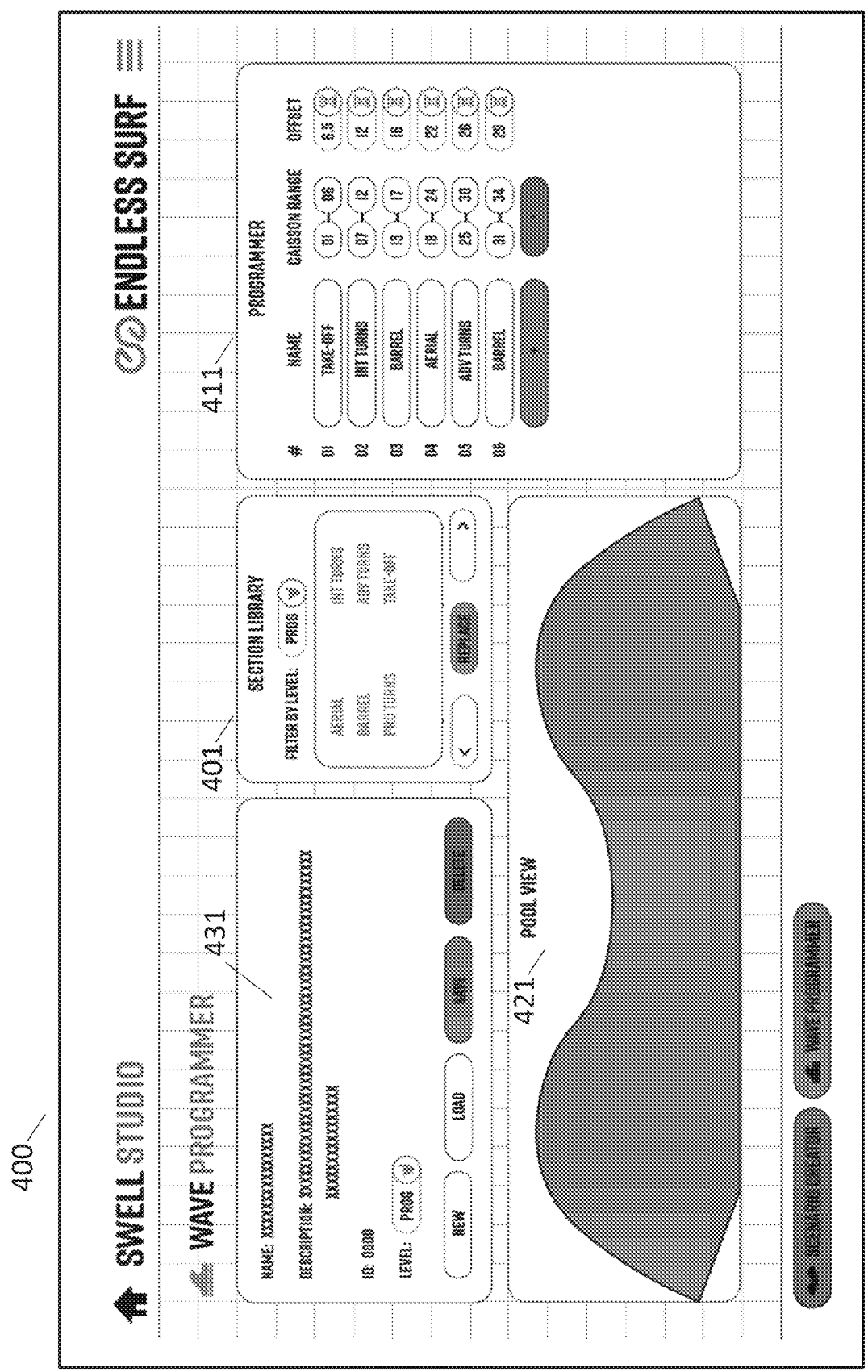
FIG. 4 illustrates a wave programmer screen for forming a wave program according to one embodiment of the invention.

FIG. 4 depicts one embodiment of a wave programmer 400. The user employs the wave programmer 400 to chain together one or more wave section profiles (each composed of one or more profiles) to create a wave. In a preferred embodiment, a user may begin by accessing the section library module 401. Preferably, the section library will provide options for the user to filter the section library according to relevant parameters. As shown in FIG. 4, the user has filtered the library by skill level "Prog." The section library module 401 is then populated with those sections that users have indicated are suitable for "prog" level surfers. Preferably, the user will also be able to select whether to show all section profiles of a particular level, just those sections that this particular user has created for that level, or those section for that level that fit some other secondary filter such creator name, organization sponsorship, etc. As seen in FIG. 4, the section library has been populated with six different named sections: Aerial, Barrel, Pro Turns, Int Turns, Adv Turns, and Take-Off. From these options, the user can choose to add wave sections to the programmer module 411. As shown in FIG. 4, the "replace" option indicates that a selected section may be placed into the programmer in the next available slot, or if all positions are already taken, in a selected slot.

The programmer module 411 in this embodiment allows the user to customize the wave in several ways. First, the user will select the particular wave sections that will comprise the wave. As shown in this embodiment, the user has chosen six wave sections, listed in order in the programmer module 411. Second, the user may chose the particular caisson range that each section will occupy. Typically, the caisson range will be set by the number of profiles in the section, and the order in which the wave sections are added to the programmer module 411. Here, for example, the "take-off" section is assigned first in order, and has six profiles in the section and has therefore been assigned to caissons 01-06. It can be assumed that the caissons will typically be ordered according to position along the wave pool wall housing the caissons. For example, from an overhead view of the pool caisson 01 may be furthest to the right in the series of caissons, and caisson 34 may be furthest to the left, indicating a wave moving from right to left. In the case of a split wave pool, in which the pool is used to create two waves moving from the center of the caisson wall in opposite directions, it may be convenient to assign a different numerical order to the caissons that better reflects the order of operation.

Here, the six wave sections have been added to the wave pool in order, occupying caissons 01 through 34. Having added one or more wave sections to the programmer module 411, the wave program may be considered complete. Thereafter, the custom wave program may be saved as described below.

The wave programmer 400 also includes an overhead pool view 421, which may be used to call out various features of a pool during wave programming. For example, in one embodiment, a user may select wave section 01 from the programmer module 411. Because wave section 01 corresponds to caisson range 01-06, the pool view would provide a visual indicator showing where those caissons are located. In the scenario described above, for example, the pool view 421 might display a rectangle on the bottom right corner of the pool showing where caissons 01 through 06 are located. The pool view would necessarily be customizable to fit the particular facility in use.

The user would preferably save the wave program using the description module 431. As with previous screens, the user can assign names, descriptions, IDs, skill levels, and other details in the description module 431. The user will use the description module 431 to load a pre-saved wave program, to create new wave programs, and to delete or reset a wave program in the process of being created.

When a wave has been constructed and saved, the wave is then "played" by the system, whereby the controller reads the loaded profiles that comprise the wave sections and ultimately the wave. During this process the intake valves in each caisson will be dynamically adjusted to match the preload height of the profile assigned to that chamber. The valves and chamber are thus in preload state. At the same time the controller will control the exhaust valves in each chamber to regulate fan power efficiency. In this way, each valve structure (intake and exhaust valves) in each chamber actuates simultaneously across the entire wave. Thereafter, the caissons will stay in the preload state for longer or shorter periods (depending on the offset in the profiles) before doing entering phase two and three of the chamber profile. During phase two of the chamber profile, the exhaust controller is turned off or overwritten. During phase three the exhaust controller is reactivated. Once phase two and three are complete, the caisson returns to the pre-load stage. The same process happens simultaneously in each chamber in the pool, according to the particular chamber profile assigned to that chamber. Thus, the actuation of each chamber happens in unison but each stage happens at different rates according to the preset chamber profile.

Due to the customizable nature of waves created using the invention, the length of time it takes to complete a cycle of each wave will differ. The user may also create a scenario to fill the allotted pool time. Although the scenario creator screen is not depicted in the figures, one example of how the scenario creator would work is as follows: suppose a user has access to the wave pool for one hour. The user may choose to run "WAVE 1" for twenty minutes, followed by "WAVE 2" comprising different sections for the next twenty minutes, and then "WAVE 3" again comprising different wave sections for the final 20 minutes. Having thus created a one hour scenario comprising three waves, each comprised of different wave section profiles, which are in turn comprised of different custom profiles, the user has created a fully customized set of waves. In this scenario described in this paragraph, the pool will create custom WAVE 1 over and over for twenty minutes, thereafter switching to custom WAVE 2 for the next twenty minutes, and then to custom WAVE 3 for the final twenty minutes. It will be understood that a user may choose any suitable combination of waves for any suitable length of time in creating a scenario.

In one embodiment, the system and method described herein may be used in connection with bespoke display hardware installed at the wave facility. In other embodiments, the system and method described herein may be employed using any suitable computer, tablet, or mobile app program.

While certain embodiments have been provided and described herein, it will be readily apparent to those skilled in the art that such embodiments are provided by way of example only. It should be understood that various alternatives to the embodiments described herein may be employed, and are part of the invention described herein. It will be understood that the particular position of any module or feature on a particular screen is not intended to be limiting unless specifically noted as such. Likewise, a particular screen, module, or feature might be separated from or combined with another screen, module, or feature, or might be transferred to a different screen or screen portion without departing from the invention. It is also understood that commonly known elements of GUIs are employed in the invention, such as drop down menus, buttons, selectors, etc. The description will not go into detail regarding such well-known features as they will be understood by a person of ordinary skill in the art.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

The above descriptions of illustrated embodiments of the system, methods, or devices are not intended to be exhaustive or to be limited to the precise form disclosed. While specific embodiments of, and examples for, the system, methods, or devices are described herein for illustrative purposes, various equivalent modifications are possible within the scope of the system, methods, or devices, as those skilled in the relevant art will recognize. The teachings of the system, methods, or devices provided herein can be applied to other processing systems, methods, or devices, not only for the systems, methods, or devices described.

The elements and features of the various embodiments described can be combined to provide further embodiments. These and other changes can be made to the system in light of the above detailed description.

In general, in the following claims, the terms used should not be construed to limit the system, methods, or devices to the specific embodiments disclosed in the specification and the claims, but should be construed to include all processing systems that operate under the claims. Accordingly, the system, methods, and devices are not limited by the disclosure, but instead the scope of the system, methods, or devices are to be determined entirely by the claims.

While certain aspects of the system, methods, or devices are presented below in certain claim forms, the inventors contemplate the various aspects of the system, methods, or devices in any number of claim forms. Accordingly, the inventors reserve the right to add additional claims after filing the application to pursue such additional claim forms for other aspects of the system, methods, or devices.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A system for creating and controlling a wave profile in a wave pool, comprising:
   a pool wave generator having a pool area and a plurality of chambers for generating a wave in the pool;
   a graphical user interface that allows a user to define a chamber water height profile within each chamber of the plurality of chambers;
   a valve structure comprising one or more intake valves for allowing air into the plurality of chambers and one or more exhaust valves for venting air from the plurality of chambers;

a controller capable of controlling the one or more intake valves and the one or more exhaust valves to control the amount of air and water in each chamber of the plurality of chambers;

wherein the one or more intake valves and one or more exhaust valves are capable of being selectively opened to any valve angle from fully closed to fully open; and wherein the controller automatically adjusts the valve angle of the intake and exhaust valves to match a target water height within each chamber.

2. The system of claim 1 wherein the chamber water height profile in each chamber of the plurality of chambers is independent of the chamber water height profile in each other chamber of the plurality of chambers.

3. The system of claim 2 wherein the graphical user interface allows the user to define a wave section comprising a plurality of chamber water height profiles.

4. The system of claim 3 wherein at least one chamber water height profile is different than at least one other chamber water height profile in the wave section.

5. The system of claim 3 wherein a plurality of wave sections are grouped together to create a wave to be released into the wave pool.

6. The system of claim 5 wherein at least one wave section is different than at least one other wave section in the plurality of wave sections.

7. The system of claim 1 wherein the valve structures in each chamber of the plurality of chambers are actuated in unison.

8. The system of claim 1 wherein each the valve structures in each chamber of the plurality of chambers is actuated according to the water height profile set for each respective chamber.

9. A method for creating and controlling a wave profile in a wave pool, comprising:

providing a plurality of wave generating chambers;

providing a valve structure in each of the plurality of wave generating chambers, wherein each valve structures comprises one or more intake valves for allowing air into the plurality of wave generating chambers and one or more exhaust valves for venting air from the plurality of wave generating chambers;

providing a controller capable of selectively opening each intake valve and each exhaust valve to control the amount of air and water in each of the plurality of wave generating chambers;

providing a graphical user interface that allows a user to determine a chamber profile comprising a water height profile and a release velocity profile of water for each chamber of the plurality of wave generating chambers;

simultaneously actuating the valve structures in each chamber of the plurality of chambers to control the amount of air and water in each chamber according to the chamber profile of each chamber;

releasing water from each chamber of the plurality of wave generating chambers according to the chamber profile assigned to each chamber.

10. The method of claim 9 wherein the chamber profile of a first chamber is different than the chamber profile of a second chamber.

11. The method of claim 10, wherein the graphical user interface allows the user to create a wave section comprising a plurality of chamber profiles.

12. The method of claim 11 wherein the graphical user interface allows the user to create a wave program comprising a plurality of wave sections.

\* \* \* \* \*